(12) United States Patent
Longstaffe et al.

(10) Patent No.: US 12,573,510 B2

(45) Date of Patent: Mar. 10, 2026

(54) DEPRESSURISATION VALVE

(71) Applicant: Rolls-Royce SMR Limited, Derby (GB)

(72) Inventors: Brett J. Longstaffe, Derby (GB); Michael Parrott, Derby (GB)

(73) Assignee: Rolls-Royce SMR Limited, Derby (GB)

( * ) Notice: Subject to any disclaimer, the term of this patent is extended or adjusted under 35 U.S.C. 154(b) by 22 days.

(21) Appl. No.: 18/683,732

(22) PCT Filed: Aug. 11, 2022

(86) PCT No.: PCT/EP2022/072596
§ 371 (c)(1),
(2) Date: Feb. 14, 2024

(87) PCT Pub. No.: WO2023/020944
PCT Pub. Date: Feb. 23, 2023

(65) Prior Publication Data
US 2024/0355489 A1 Oct. 24, 2024

(30) Foreign Application Priority Data

Aug. 19, 2021 (GB) ...................................... 2111910

(51) Int. Cl.
*G21C 9/004* (2006.01)
*F16K 17/22* (2006.01)

(52) U.S. Cl.
CPC .............. *G21C 9/004* (2013.01); *F16K 17/22* (2013.01)

(58) Field of Classification Search
CPC ................................. G21C 9/004; F16K 17/22
(Continued)

(56) References Cited

U.S. PATENT DOCUMENTS 285,163 A * 9/1883 Ross ....................... F16K 17/10
137/505.11
855,796 A * 6/1907 Mason ............... G05D 16/0663
137/489.5
(Continued)

FOREIGN PATENT DOCUMENTS

EP 3667678 A1 6/2020

OTHER PUBLICATIONS

UKIPO Search Report, Application No. GB-2111910.2, dated May 18, 2022, 9 pages.
(Continued)

*Primary Examiner* — Angelisa L. Hicks

(74) *Attorney, Agent, or Firm* — Quarles & Brady LLP

(57) ABSTRACT

A depressurisation valve (100) for a pressurised cooling circuit, comprising a main valve (101), a pilot line (104) fluidically coupled to the inlet (110) and closable by a first control valve (105), the first control valve controlled by pressure at the inlet to open above a low pressure threshold, a valve dome (106) containing a first piston (107) coupled to the main valve, the valve dome being fluidically coupled to the pilot line, wherein in normal operation, pressure on the first piston urges the main valve into the closed position, and when the pressure in the coolant circuit is lower than the low pressure threshold, the first control valve closes to allow the main valve to open, when the pressure in the coolant circuit is higher than the high pressure threshold, a second control valve opens to transmit fluid pressure to apply a second force to the main valve opposing the first force to urge the main valve to the open position.

9 Claims, 7 Drawing Sheets

(58) Field of Classification Search
USPC ....... 137/455, 458, 464, 488, 489.5, 596.14,
137/625.6
See application file for complete search history.

(56) References Cited

U.S. PATENT DOCUMENTS

| | | | | |
|---|---|---|---|---|
| 871,260 | A * | 11/1907 | Dyer ................... | G05D 16/163 |
| | | | | 137/489.5 |
| 3,977,423 | A * | 8/1976 | Clayton .............. | G05D 16/166 |
| | | | | 137/487 |
| 5,988,988 | A * | 11/1999 | Tokumasu .......... | F04B 27/1804 |
| | | | | 137/489.5 |
| 9,038,659 | B2 * | 5/2015 | Watanabe ................ | F01M 1/16 |
| | | | | 137/488 |
| 2008/0251130 | A1 * | 10/2008 | Folk .................... | G05D 16/163 |
| | | | | 137/489.5 |
| 2020/0194134 | A1 | 6/2020 | Shearer et al. | |

OTHER PUBLICATIONS

International Search Report, International Application No. PCT/EP2022/072596, European Patent Office-Searching Authority, mailed Oct. 31, 2022, 2 pages.

* cited by examiner

DEPRESSURISATION VALVE

RELATED APPLICATIONS

This application is a 35 U.S.C. § 371 national phase application of PCT/EP2022/072596 (WO-2023/020944 A1), filed on Aug. 11, 2022, entitled "DEPRESSURISATION VALVE", and claims priority to GB-2111910.2 filed on Aug. 19, 2021, the disclosures of which are incorporated herein by reference in their entirety.

This application claims priority from GB 2111910.2 filed 19 Aug. 2021, the contents and elements of which are herein incorporated by reference for all purposes.

FIELD OF THE DISCLOSURE

The present disclosure concerns a passive depressurisation valve for a cooling circuit, particularly for a nuclear reactor.

BACKGROUND OF THE DISCLOSURE

Nuclear reactors are a desirable addition to a power grid as they present ideal base load stations. This is because they are considered a low carbon source of electricity and are not dependent upon variable weather conditions, which are limiting factors for other low carbon sources. These features allow them to be used as the backbone of a complete electricity network. One of the most common types of nuclear reactors used around the world is the pressurised water reactor (PWR) in which a primary circuit of pressurised water is used as the coolant, moderator and as well as the heat transfer fluid to the steam generator. The relative simplicity of the system provides them with the advantage that these systems can be scaled. Consequently, they are suitable for both large scale power plants as well as for small modular reactors. However, as with all nuclear power stations they require a robust safety system to prevent accidents.

Modern safety systems for nuclear reactors aim to be both active and passive. Active systems operate under the control of an operator and/or running systems, such as pumps and generators, which in normal operation are associated with emergency control. Passive safety systems do not require any external operator input or active systems running in order to operate. This latter system is beneficial as it allows for automatic self-control of the system that is not requisite on external power or user input. In emergency situations this is desirable as, in certain cases, power to the reactor may be disrupted or it may not be possible for operators to control the system manually in which case passive control systems allow the system to remain safe.

In the case of a pressurised water reactor a key fault which requires protective action is a Loss of Coolant Accident (LOCA) event, in which the reactor coolant inventory is lost, limiting the heat removal capacity of the reactor. If not rectified, a LOCA fault could lead to the failure of a nuclear reactor, due to the heat produced by the radioactive decay within the fuel rods causing damage to the reactor plant, including fuel clad melt and the release of fission products. Consequently, to prevent this from happening nuclear reactors are equipped with emergency cooling systems that can replace the coolant inventory if there is a fault. In a PWR the system to protect against this is known as the Emergency Core Cooling System (ECCS). These systems typically involve the opening of pipelines to discharge the present reactor coolant inventory. The discharge process reduces reactor circuit pressure, allowing fresh coolant to be injected, into the system at low pressure under the force of gravity. The initial discharge pipelines are normally isolated from the reactor using isolation vales, which can be opened upon the detection of a LOCA. Typically this involves instrumentation to monitor the parameters of the plant, a control system to generate initiation signals on reaching set points and valve actuators to change the valve positions.

Systems to achieve this isolation of the coolant from the emergency supply of cooling fluid in the event of a LOCA are known in the art. Accumulator Isolation Passive Valve (AIPV) are used to isolate a pressurised accumulator at 55 bar and the core at 70 bar. During normal operation when there is a reduction of pressure in the reactor circuit, the valve opens proportional to the difference in pressure between the accumulator located upstream and the reactor circuit and the core downstream. For the AIPV, since the valve position is proportional to the pressure difference, once the pressure equalises, either due to a recovery of reactor circuit pressure or from a discharge of accumulator pressure, the valve shuts, isolating the line once again. The valve therefore does not remain latched open to allow for complete system depressurisation. Alternatively, an Automatic Safety Valve for Accumulator Depressurisation (AS-VAD) valve can be used. These are used to vent gas from the gas space of an accumulator by opening a valve when the force applied from the pressure in the system drops below a level, which is set by the force applied by the spring acting on the valve plunger. The ASVAD valve is not an isolation valve in the usual sense, but is specifically designed for the venting of gas. As such, it is not suitable for the isolation of high pressure, high temperature water. As neither valve operates based upon high pressure and cannot open in the event of an intact circuit fault transient in which the system pressure and temperature rise, as such improvements are required. The AP1000 reactor design by Westinghouse features a valve for discharging the heated coolant—termed the Squib Valve. The Squib valve is equipped with an explosive charge that is used to open the valve; however, spurious operation of the squib valve could result in a major radiological hazard. Consequently, the safety justification of the plant design is dependent upon a highly reliable Control and instrumentation (C&I) system to prevent spurious operation, and as such adds significant cost to the plant design. As such there is a desire to develop a simplified passive valve to allow for depressurisation of the coolant circuit.

SUMMARY OF THE DISCLOSURE

The present invention concerns a passive depressurisation valve for a cooling circuit, particularly for a nuclear reactor.

In a first aspect, there is provided a depressurisation valve for a pressurised cooling circuit, the depressurisation valve comprising an inlet for coupling to the cooling circuit, an outlet, a main valve configured to move between an open position and a closed position, the closed position preventing fluid flow through the main valve from the inlet to the outlet, a pilot line fluidically coupled to the inlet and closable by a first control valve, the first control valve controlled by pressure at the inlet to open above a low pressure threshold, a second control valve controlled by pressure at the inlet and configured to open above a high pressure threshold, the high pressure threshold being greater than the low pressure threshold, a valve dome containing a first piston coupled to the main valve, the valve dome being fluidically coupled to the pilot line, such that in normal operation, the pilot line is operable to transmit fluid pressure from the inlet into the valve dome to apply pressure on a first face of the first piston, the first piston thereby applying a first force to the main valve urging it into the closed position, and when in operation the pressure in the coolant circuit is lower than the low pressure threshold, the first control valve is configured to close and remove the pressure from the face of the first piston and allow the main valve to open when in operation the pressure in the coolant circuit is higher than the high pressure threshold, the second control valve is configured to open and transmit fluid pressure to apply a second force to the main valve opposing the first force to urge the main valve to the open position.

The depressurisation valve may further comprise biasing means to bias the main valve open, wherein in normal operation the first force applied by the first piston is sufficient to overcome the bias.

The biasing means may be a spring, or the biasing means may be fluid pressure applied to a face of the main valve from the inlet when in use.

The second control valve may be operable to open a second pilot line to apply pressure to an opposite face of the first piston urging the main valve open.

The second control valve may be operable to open a second pilot line to apply pressure to a second piston coupled to the main valve so as to apply a second force to the main valve opposing the first force and urging the main valve into the open position.

The first control valve in some embodiments is a changeover valve which comprises a changeover piston and a changeover biasing means operable to bias the first control valve closed, wherein in normal operations pressure in the pilot line is applied to a face of the changeover piston to urge the first control valve open in opposition to the changeover biasing means, and wherein the second control valve is operable, when the high pressure threshold is exceeded, to open a control valve pilot line to apply pressure to the opposite face of the changeover piston to urge the first control pilot valve closed. The second control valve may be operable to open a second pilot line to apply pressure to an opposite face of the first piston urging the main valve open.

According to a second aspect there is provided a nuclear reactor with a cooling circuit that includes a depressurisation valve as discussed above.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Emergency core cooling systems (ECCS) are provided to ensure the safe shutdown of a nuclear reactor when accident conditions arise. The cooling system is configured to provide a safety mechanism in the event of a variety of accident conditions. There are a number of sub-systems that go into forming the ECCS, each having redundancies, so that the reactor can be safely shutdown even if there is a failure in one of the sub-systems. Of particular interest here are the passive systems such as an Automatic Depressurisation System (ADS), which consists of one or more valves that open to depressurise the main coolant system and to allow the lower pressure emergency coolant systems to function. Low pressure injection system are used as they can rely on natural forces such as gravity and hence do not require high classification electrical supplies which in turn drive high costs.

A Passive Depressurisation (PaD) Valve is a normally shut valve, which lies in the discharge pipelines extending from the reactor circuit. It provides a second and diverse method of isolation from other control system initiated/actuated isolation valves which are located in the same discharge line. The PaD valve is designed to change from a shut state to an open state upon the detection of increasing or decreasing pressure upstream of the valve. The advantage of the incorporation of such a system is that the valve will open in the event of a significant LOCA causing loss of pressure, or elevated reactor circuit pressure, to discharge reactor coolant and allow for the injection of fresh coolant under gravity. There would normally be an automatic isolation valve (AIV) in the discharge outlet downstream of the PaD valve, which may be an electromechanical valve interlocked with the emergency control circuits. The PaD valve prevents a loss of coolant if the AIV spuriously opens if the reactor coolant circuit pressure is within safe limits.

Figure 1:
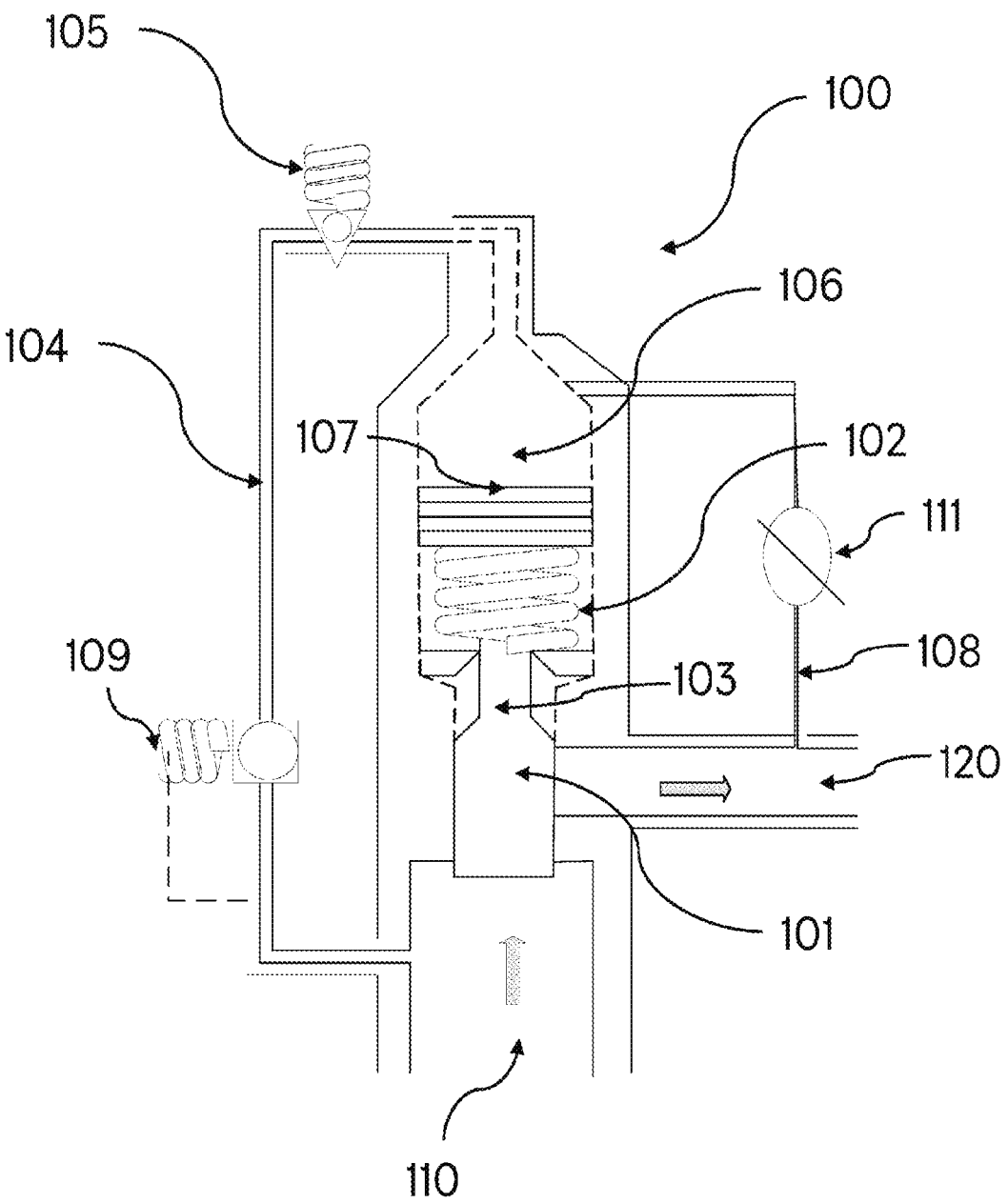
FIG. 1 is a schematic of a passive depressurisation valve.

A schematic example of such operation is shown in FIG. 1. which shows a valve 100 arrangement similar to a valve disclosed in US2020194134A1 by Rolls-Royce. The valve has an inlet 110 for coupling to the cooling circuit, an outlet 120, and a main valve 101 configured to move between and open position and a closed position, the closed position preventing fluid flow through the main valve from the inlet to the outlet; In this PaD valve 100 has a main valve 101 mounted upon a compression spring 102, which is forced down by fluid pressure on a face of a piston 107 to be in a closed position. However, when the fluid pressure drops below a threshold defined by the piston and the spring, the spring pushes a valve piston coupled to a valve stem 103 up and opens the main valve 101. A fluid connection (not shown) to outside or the outlet may be present into the space below the piston allowing the pressure below the piston to remain at ambient pressure, even if there is some leakage of fluid past the piston. It is through the movement of the valve piston and stem relative to the coolant system pipeline to which it is connected that causes the main valve to open and close. With the main valve in the shut/closed position some fluid in the upstream reactor coolant circuit passes through the pilot line 104.

The first pilot valve 105 is operable to close the pilot line and shut off the fluid flow. The first control pilot valve controlled by pressure in the pilot valve from the inlet to open above a low pressure threshold. Thus as long as the pressure at the inlet is greater than the low pressure threshold, the first pilot valve will remain open, fluidically connecting the inlet to the main valve dome 106 which contains the piston. In normal operation, the pilot line is operable to transmit fluid pressure from the inlet into the valve dome to apply pressure on a first face of the first piston, the first piston thereby applying a force to the main valve urging it into the closed position. The first pilot valve may be a poppet valve, with its own piston which holds the poppet valve open by the fluid pressure in the pilot line from the inlet, until the pressure drops below the low pressure threshold. The low pressure threshold may be defined by an adjustable spring in the poppet valve which allows the threshold to be adjusted.

The second pilot valve 109 is also operable to close the pilot line and shut off the fluid flow, except by the use of a sensing line connected to the second pilot valve, the second pilot valve is configured to close when the pressure entering the pilot line from the inlet exceeds a high pressure threshold. This may be achieved for example by having a hydraulic actuator in the second pilot valve, or a piston and spring arrangement.

The bleed line 108 is configured such that its resistance to fluid flow is higher down the bleed line than it is through the pilot line. For example, a throttle or choke 111 may be inserted in the bleed line to set its fluid resistance to an appropriate value, or the bleed line could be manufactured to be constricted to achieve the required resistance. The fluid resistance is determined such that the pressure in the main valve dome can be kept above the value needed to close the main valve, but the pressure will drop quickly enough to allow the main valve to open in emergency conditions within a predetermined time period. This can be calculated by flow modelling, or by experimentation and adjustment. In the event of a spurious AIV opening a small slow leak of fluid passes down the bleed line and through the AIV, but the flow into the main chamber via the pilot line is greater than out of the chamber via the blowdown line. Thus the first pilot valve poppet spring and the main valve spring 102 remain compressed and consequently the main valve 101 is maintained shut. This state will occur for as long as there is enough pressure in the main chamber to compress these springs. In the event of a LOCA and a subsequent opening of the AIV, where the reactor circuit pressure is not maintained, the force provided by the reactor circuit fluid pressure in the pilot line drops to a level below the first pilot valve poppet spring force resulting in a shutting of the pilot poppet valve. This cuts off the flow to the main chamber from the reactor circuit and the fluid in the main valve chamber escapes via a blowdown line. This results in the force exerted on the main valve spring by the fluid pressure drops, allowing the spring to extend and thus opening the main valve.

In the event of the pressure entering the pilot line from the inlet exceeds the high pressure threshold, the second pilot valve will close, cutting off the fluid supply to the main valve dome and therefore allowing the main valve to open as the pressure drops in the dome. The second pilot valve may be a latching valve, so that it remains open as the pressure even when the pressure drops below the high pressure threshold, the latch being mechanical or electromechanical requiring manual or electronic reset to allow the valve to be closed. Alternatively or additionally the main valve and/or the first pilot valve may be latching, so that once activated they remain open until reset. If the latching mechanism is electromechanical, it may be connected to a control and instrumentation system, so that an operator receives a signal to indicate that the depressurisation valve has been activated, and there may be a control circuit operable to release the latch electromechanically once the cause of the activation has been remedied. In a nuclear power plant, the procedure for doing this would be subject to regulatory approval.

With the main valve open depressurisation of the coolant system can occur.

The low pressure threshold is a lower pressure than the high pressure threshold, which means there is an operating range of pressures that are acceptable between these two thresholds during normal operation and startup/shutdown procedures.

When any of the PaD valves described herein are used in a pressurised water reactor, the low pressure threshold will be set below the normal operating pressure of about 155 bar. For example, this could be at about 70 bar. It could also be at pressures higher than 70 bar, such as at about 75, 80, 85, 90 bar, or for pressures lower, such as at about 65, 60, 55, or 50 bar. The high pressure threshold could be set to close at 165 bar. The valve could also be set to close at pressures higher than this, for example at about 166, 167, 168, 169, 170, 171, 172 173, 174, 175 bar or higher. Or lower, for example at about 164 or 163, 162, 161 or 160 bar. In other applications the high and low pressure threshold would be adjustable in respective ranges either side of the normal operating pressure to provide an adequate safety margin to protect the plant and pressure vessels.

Such configuration has the benefit that it will not result in a significant hazard in the event of a single spurious AIV valve opening or in a C&I failure.

Where like reference numbers are given to like feature in the figures, the features may be considered to have the same or similar function to those in other figures except for the differences described.

Figure 2:
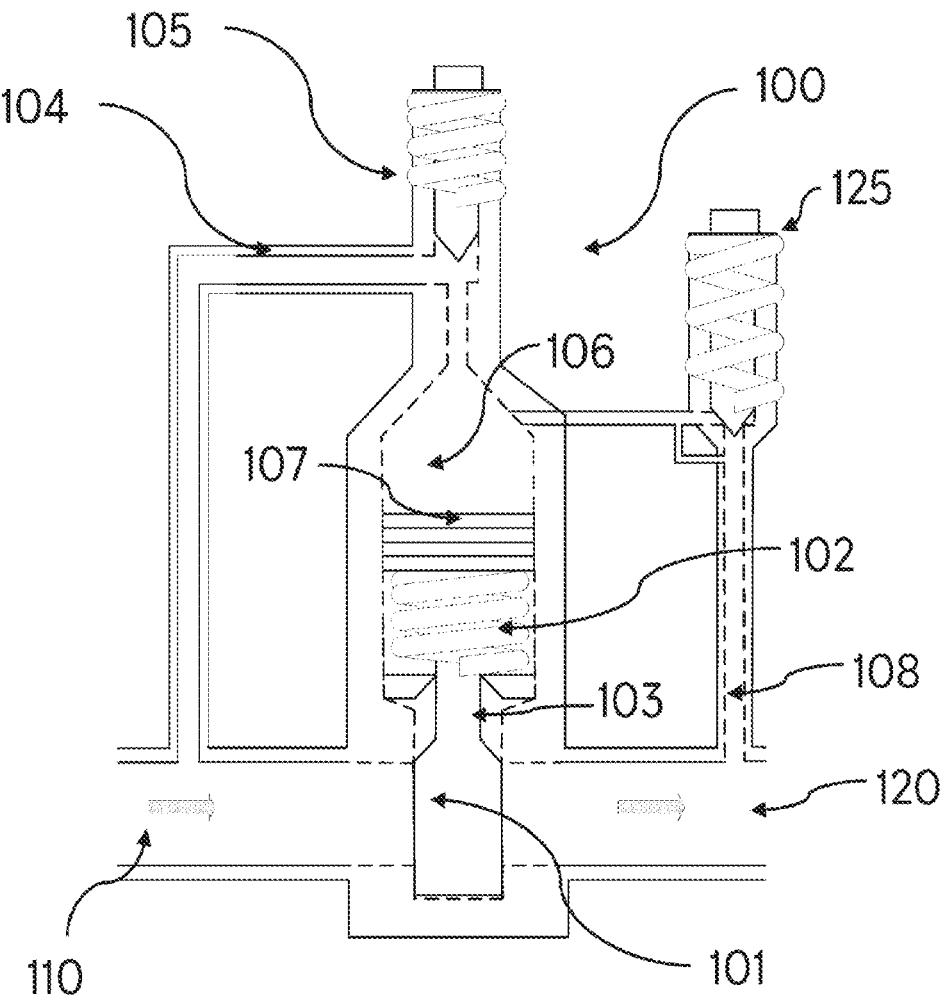
FIG. 2 is a schematic of an embodiment of passive depressurisation valve as described herein.

Turning now to FIG. 2, an alternative valve arrangement is illustrated to provide improved control of the valve opening. The valve in FIG. 2 shows PaD valve 100 with main valve 101, compression spring 102, valve stem 103, pilot line 104 with first pilot valve 105, main valve dome 106, piston 107, inlet 110 and outlet 120 which serve similar functions to those described in FIG. 1 above. The valve in FIG. 2 has a bleed valve 125 in the bleed line 108. The bleed valve is configured to open when the pressure in the bleed line exceeds a high pressure threshold, and unlike the valve of figure one, the bleed line 108 in this arrangement has a lower fluid resistance than the pilot line, such that when the bleed valve is open, the fluid will escape from the main valve dome through the bleed line faster than it enters through the pilot line, causing the pressure to rapidly drop and the main valve to open. There is also a bypass line around the bleed valve (not numbered) which allows the pressure in the main dome to drop when the first pilot valve is closed.

In other words, in low pressure conditions pressure through the pilot line 104 will reduce below the set point of first pilot valve 105. The pilot control valve will shut, the pressure on the piston 107 will reduce and the main valve 101 will open. In high pressure conditions, pressure through the pilot line 104 will be greater than the first pilot valve 105 setpoint (high pressure threshold) and so will remain open, the bleed line valve 125 will also open because the pressure is higher than the high pressure threshold. Due to the sudden pressure drop the piston 107 will lift, pressure reduction on the piston 107 and pressure under seat along with the spring 102 will keep valve open. Latches may also be present to ensure the main valve remains open once activated as described above in relation to FIG. 1, even if the system pressure drops below the high pressure threshold.

The low pressure threshold is set by adjustment of the first pilot/control valve, the high pressure threshold may be set by adjustment of the bleed line valve.

Figure 3:
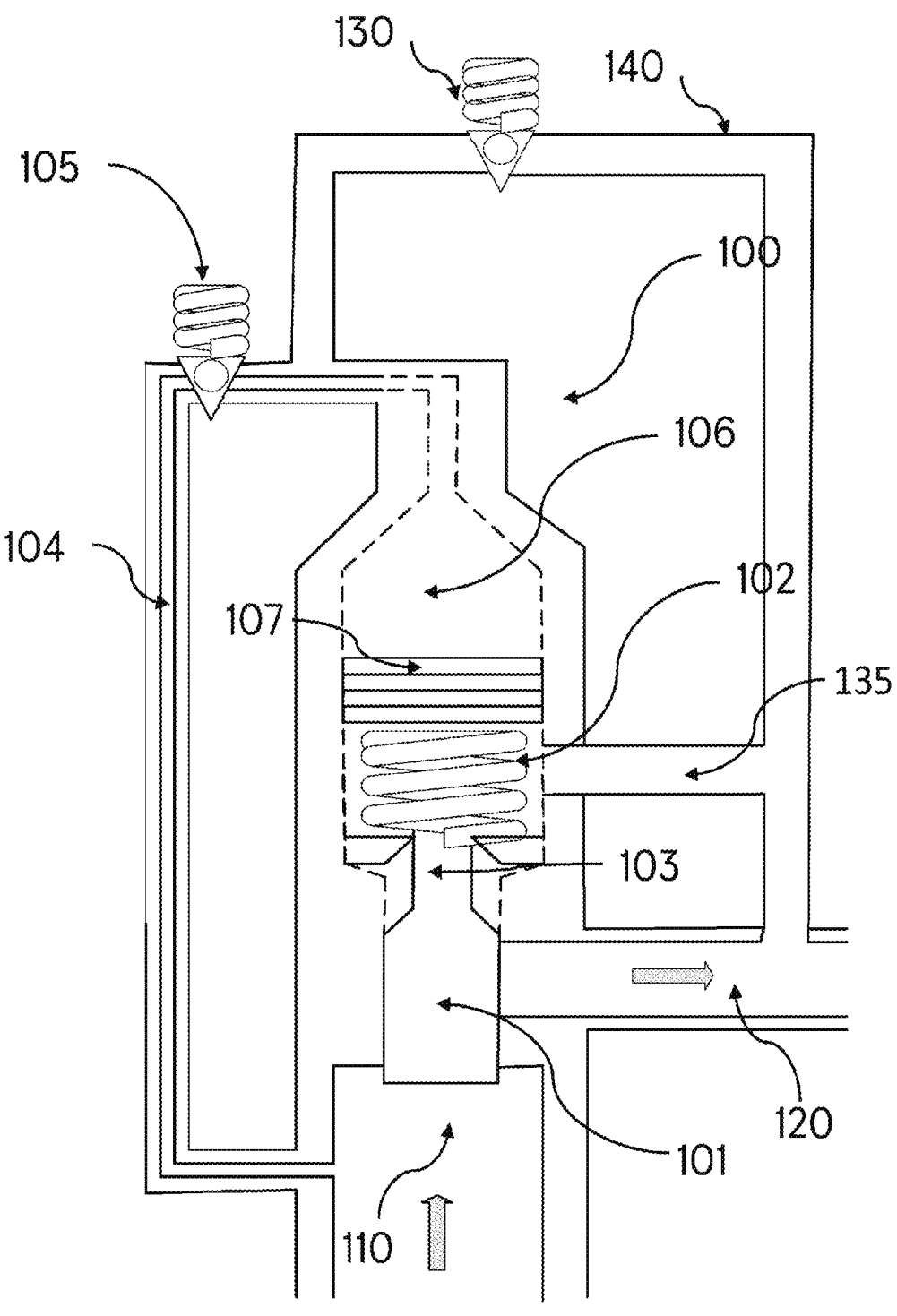
FIG. 3 is a schematic of an embodiment of second passive depressurisation valve as described herein.

Turning now to FIG. 3, another alternative PaD valve arrangement is illustrated to provide improved control of the valve opening. The valve in FIG. 2 has PaD valve 100 with main valve 101, compression spring 102, valve stem 103, pilot line 104 with first pilot valve 105, main valve dome 106, piston 107, inlet 110 and outlet 120 which serve similar functions to those described in FIGS. 1 and 2 above. The valve in FIG. 3 has a bypass valve 130 in the bypass line 140. Bypass valve 130 operates in a similar way to bleed valve 125 in FIG. 2, opening when the high pressure threshold is exceeded by the system pressure in the inlet, thus releasing the pressure in the main valve dome 106 allowing the valve to open.

In this valve arrangement, there is also shown an optional under piston line 135 which connects the space below the piston to the outlet 120 via part of bypass line 140. This therefore equalises the pressure above and below the valve allowing the valve to open more readily as a result of the spring 102 or other biasing means which provide a restoring force on the piston to open the valve. This means that even if there is some resistance to fluid flow in a downstream part of the bypass line or the outlet, e.g. caused by a blockage, the valve will still be able to fully open.

Figure 4:
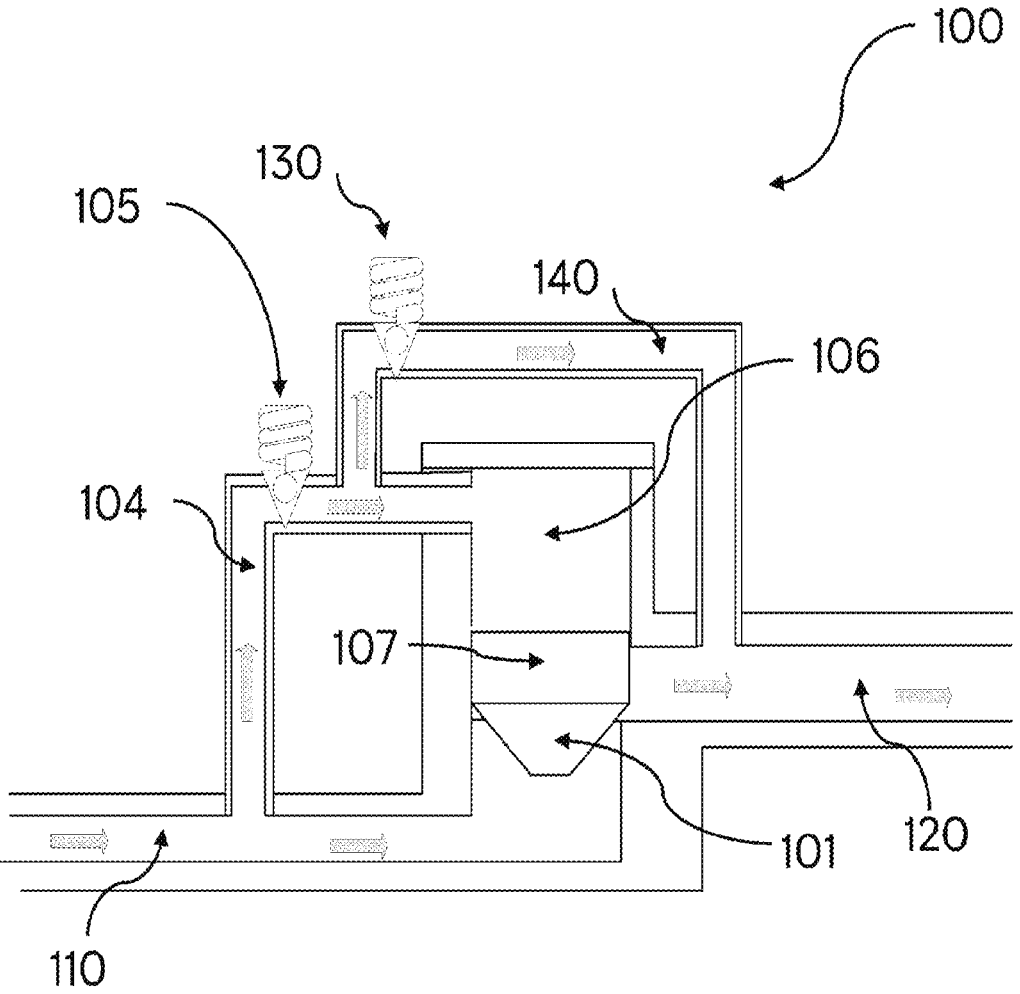
FIG. 4 is a schematic of an embodiment of third passive depressurisation valve as described herein.

Turning now to FIG. 4, a third alternative PaD valve arrangement is illustrated to provide control of the valve opening. The valve in FIG. 4 has PaD valve 100 with main valve 101, pilot line 104 with first pilot valve 105, main valve dome 106, piston 107, inlet 110 and outlet 120 which serve similar functions to those described in FIGS. 1 and 2 above. The valve in FIG. 4 also has a bypass valve 130 in the bypass line 140. Bypass valve 130 operates in a similar way to bleed valve 125 in FIG. 2, opening when the high pressure threshold is exceeded by the system pressure in the inlet, thus releasing the pressure in the main valve dome 106 into outlet 120 allowing the valve to open.

In FIG. 4 however, there is no restoring spring. The main valve 101 is biased open by the system pressure in the inlet 110. Main valve 101 is urged open by the fluid pressure in the inlet 110 on the valve face. When the main valve dome 106 is pressurised via pilot line 104, the pressure on the piston 107 exerts a greater force on the valve because the area of the piston is greater than the face of the valve 101 exposed to the inlet pressure. Gravity will also apply some downward force closing the valve providing the valve is mounted vertically as shown in the figure. This design is therefore simpler than that in FIG. 2 or 3, requiring fewer parts.

Operation of the third PaD valve of FIG. 4.

Normal Conditions

There are two pressure set devices, first pilot valve 105 is set at low pressure, the second (bypass) valve 130 is set at the high pressure threshold. The main valve 101 stays closed between the two set points.

In normal operation the set device/control valve 105 is open and pressure is in the chamber/dome 106 pushing the valve 101 closed. Set device 130 remains closed as pressure is below lift point.

Low-Pressure Demand

If the pressure reduces below low set point (low pressure threshold) the set device 105 (first pilot valve) shuts and so removes the pressure in chamber/dome 106 and the valve 101 opens. Once opened the valve may be held in position through pressure or latches.

High Pressure Automated Isolation Valve Trip

When the set device 105 is pressured above the low pressure set point and the main valve is shut, if pressure increases beyond the high pressure set point the second set device 130 opens; as the bypass line 140 has a lower fluid resistance, .g. larger bore, this reduces the pressure on the piston 107 compared to the inlet pressure and so the valve opens.

A common feature of the valves in FIGS. 2, 3 and 4 is the use of two control valves to operate a main valve with a piston and a valve dome, wherein when the pressure in the coolant circuit is lower than the low pressure threshold, the first control valve is configured to close, thus removing the source of pressure from the main valve dome and thus the top face of the first piston and allowing the main valve to open, and when the pressure in the coolant circuit is higher than the high pressure threshold, the second control valve is configured to open and release pressure from the main valve dome allowing the main valve to open.

Figure 5:
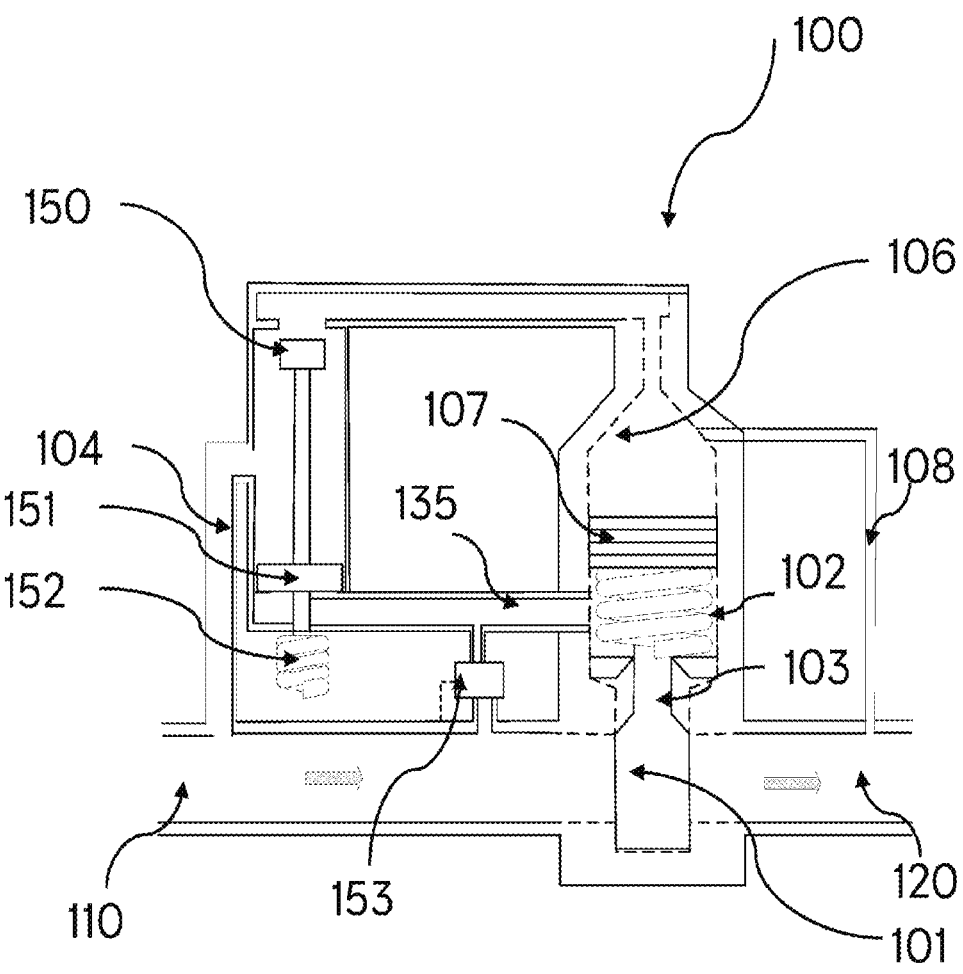
FIG. 5 is a schematic of an embodiment of fourth passive depressurisation valve as described herein.

As shown in FIG. 5, a fourth alternative PaD valve arrangement is illustrated to provide control of the valve opening. The valve in FIG. 5 has PaD valve 100 with main valve 101, pilot line 104, bleed line 108, main valve dome 106, piston 107, spring 102, valve stem 103, inlet 110 and outlet 120 which serve similar functions to those described in the figures above.

In place of a pilot valve, the valve in FIG. 5 has changeover valve 150, linked to changeover piston 151. Changeover spring 152 (or other biasing means) is operable to push both changeover valve and changeover piston upwards as shown in the figure. The fluid pressure transmitted from inlet 110 via pilot line 104 will push changeover piston down to close against a seat, when the pressure is higher than the low pressure threshold, thereby holding changeover valve 150 open, allowing fluid pressure to enter valve dome 106 and close the main valve in the same way as the valves in FIGS. 1 to 3. When the pressure in the inlet drops below the low pressure threshold, changeover spring 152 will be able to overcome the pressure on changeover piston 151, changeover valve 150 will close, and the pressure in valve dome 106 will drop as fluid escape via bleed line 108, optionally through a choke or throttle to slow down the rate of pressure change. Thus the main valve will close on low system pressure.

High pressure control valve (HPCV) 153 is configured to open when the system pressure in inlet 110 exceeds the high pressure threshold. When HPCV opens, pressure is directed to the bottom of changeover piston 151, at least partially equalising the pressure from the pilot line and causing changeover valve 150 to close with the aid of changeover biasing means 152. With changeover valve 150 closed, the pressure in main valve dome 106 drops and the main valve opens.

In this valve arrangement, there is also an under piston line 135 connected to High pressure control valve (HPCV) 153, so that when the HPCV opens the pressure below piston 107 is equal to or higher than the pressure in the main chamber 106, providing a greater opening force on the main valve 101. Thus the high pressure control valve supplies an opening force to the main valve when the high pressure setpoint is exceeded. This advantageously provides a backup opening mechanism if the changeover valve 150 does not successfully open, or the pilot line is blocked.

As stated before, bleed line 108 may have a choke or throttle, or other means of providing fluid resistance, which may also be adjustable, so that rate of pressure change can be controlled to prevent excessively rapid valve movement, reducing damage to the valve mechanisms in use. Bleed Line 108 may also have a control valve in-line which opens when the high pressure threshold to rapidly release pressure from the valve dome. The size of each piston and the strength of each spring or biasing means can likewise be balanced to achieve the desired speed of valve movements.

Figure 6:
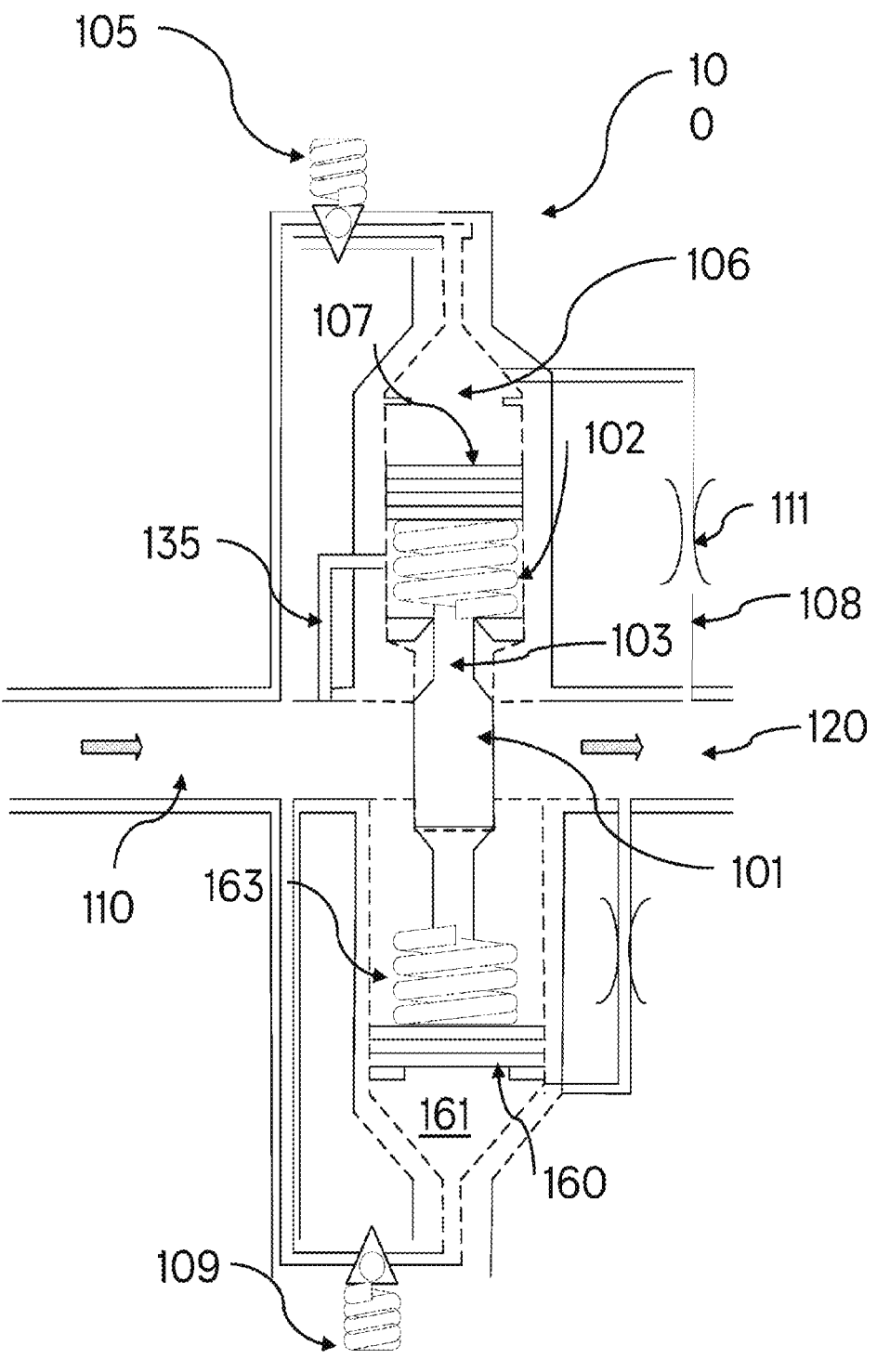
FIG. 6 is a schematic of an embodiment of fifth passive depressurisation valve as described herein.

Referring now to FIG. 6, a fifth alternative PaD valve arrangement is illustrated. The valve in FIG. 6 shows PaD valve 100 with main valve 101, compression spring 102, valve stem 103, pilot line 104 with first pilot valve 105, main valve dome 106, piston 107, inlet 110 and outlet 120 which serve similar functions to those described in FIG. 1 above. The bleed line 108 is configured such that its resistance to fluid flow is higher down the bleed line than it is through the pilot line. For example, a throttle or choke 111 may be inserted in the bleed line to set its fluid resistance to an appropriate value, or the bleed line could be manufactured to be constricted to achieve the required resistance.

As in FIGS. 1 to 4, pilot valve 105 is open when the system pressure at inlet 110 exceeds the low pressure threshold, applying pressure to piston 107 to close the main valve.

The valve in FIG. 6 also has an opposing piston 160, with its own valve dome 161. Second pilot valve 109 is operable to open when the inlet pressure exceeds the high pressure threshold, and admit fluid pressure into the second valve dome 161. The opposing piston then applies force to the main valve driving it open.

The valve in FIG. 6 has a bleed valve 125 in the bleed line 108. The bleed valve is configured to open when the pressure in the bleed line exceeds a high pressure threshold, and unlike the valve of figure one, the bleed line 108 in this arrangement has a lower fluid resistance than the pilot line, such that when the bleed valve is open, the fluid will escape from the main valve dome through the bleed line faster than it enters through the pilot line, causing the pressure to rapidly drop and the main valve to open.

Optionally, there may also an under piston line 135, which may either have its own high pressure control valve, or be connected to the second pilot valve 109, so that it admits fluid pressure into the space beneath main piston 107, providing a secondary mechanism for opening the main valve, and providing more rapid and reliable opening in high pressure conditions.

An optional spring or buffer 163 is shown to provide a cushion or shock absorber for opposing piston 160, to prevent shock and potential damage to the system during rapid valve opening.

Similar to the valve in FIG. 5, in the valve of FIG. 6 the second pilot valve is a high pressure control valve that supplies an opening force to the main valve when the high pressure setpoint is exceeded.

Figure 7:
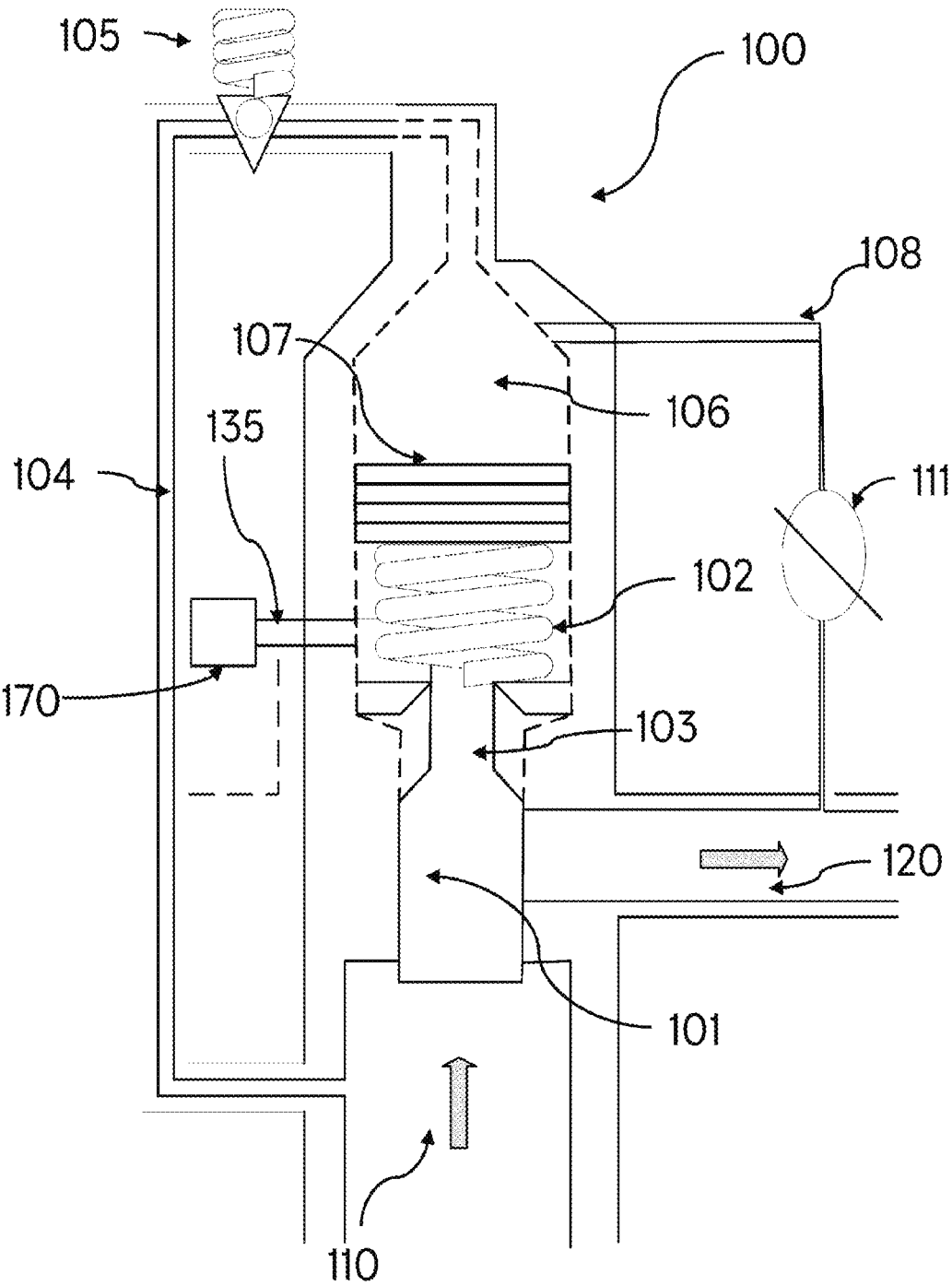
FIG. 7 is a schematic of an embodiment of sixth passive depressurisation valve as described herein.

Referring now to FIG. 7, a sixth alternative PaD valve arrangement is illustrated. The valve in FIG. 7 shows PaD valve 100 with main valve 101, compression spring 102, valve stem 103, pilot line 104 with first pilot valve 105, main valve dome 106, piston 107, inlet 110 and outlet 120 which serve similar functions to those described in the figures above. There is also bleed line 108 with throttle/choke 111 for similar purposes as described.

The high pressure control valve 170 is arranged to open when the pressure in the inlet 110 exceed the high pressure threshold, and admit the high pressure fluid into the space below piston 107 via under piston line 135. It may be connected to the pilot line, before the pilot valve 105, or may have its own connection to the inlet.

In the same way as the valves in FIGS. 5 and 6, in the valve of FIG. 7 the high pressure control valve 170 that supplies an opening force to the main valve when the high pressure setpoint is exceeded. This opening force is provided by fluid pressure from the inlet, and opposes a closing force provided by fluid pressure elsewhere, for example in the main valve dome.

The mechanism of providing a high pressure control valve, such as described in FIG. 7, to admit pressure below the piston of a main valve can be used in combination with any of the valves of FIG. 1, 2, 3, 5 or 6 to enable or assist the high pressure opening of a normally closed valve.

In combination with the mechanism described for opening the main valve in a low pressure condition, this enables a passive valve to control the depressurisation of a cooling system in both high and low pressure conditions.

In any of the PaD valves described herein, the valves which control the high pressure threshold and low pressure threshold, such as first and second pilot valves, bypass valves, high pressure control valves or bleed valves, may be fitted with an override or auxiliary actuator or bypass valve, for example an electromechanical override, to allow them and/or the main valve to be opened or closed on demand, e.g. for testing and commissioning purposes and for routine maintenance.

In most use cases in a power plant, e.g. a nuclear power plant, the valve will be part of a cooling system, with an electromechanical automatic isolating valve AIV on the outlet downstream of the pad valve. When the AIV is closed, the pressure in different parts of the pad valve may equalise, leaving the valve in an undefined state. However, as soon as the AIV opens, the main valve will operate according to the pressure thresholds of the pilot valves, bypass and/or bleed valves, and will therefore close if the system pressure is within the range between the high and low pressure thresholds. This prevents a complete loss of coolant in the event of a spurious AIV operation, but if the system pressure is outside the range defined by the upper and lower pressure thresholds, depressurises the system to enable emergency cooling to be provided at a pressure much lower than the normal system operating pressure. For example, enabling emergency cooling to be provided by gravity, the emergency cooling storage vessel only needing to be a small height above the coolant circuit to supply coolant. The system pressure may be reduced to nearly ambient pressure, i.e. atmospheric pressure via the PaD valve.

The angle of the main valve body can be straight through angled or a more torturous path e.g. globe valve body.

Within this disclosure there can be many variants of the same concept, i.e. which uses multiple pressure set points to allow a valve to be passive for a number of pressures. The design could be as a single valve or a skid of individual valves. Each of the individual valves may have different high and low pressure thresholds set, to allow the rate of depressurisation to be varied proportionally to the degree of under or overpressure. The set pressures of the relief valves can be increased or decreased to support future requirements.

The type of pressure relief can vary from a pilot valve or spring-operated relief.

The main valve can be anything from a globe valve to a lift check valve or any valve with a direct displacement movement.

The valve materials are not specific and therefore can be changed dependant on environment and medium e.g. gas, corrosive materials. The valve material may be an alloy that is resistant to neutron or other radiation damage.

Additional set points could be installed within the design by adding additional relief points and bleed lines.

Points where the bleed or pilot lines in interact with the valve body ie where the pressure is present eg pressurised under a piston to support valve opening can be changed.

Latches may be used within the above designs to hold the valves in position once actuated, however they can be removed if they are not necessary, for example if the valve is to return to the closed position.

A throttle valve can be added or removed from the pilot, bleed and/or bypass lines. They can be used to reduce or increase the speed of the valve operation, by controlling the rate of pressure change.

The pistons in some instances could be convex or concave shaped to increase the downward or upward force.

Option to include or remove the spring within the design depending on the pressures being used and therefore forces produced. The spring could be replaced with other biasing means, such as a resilient member or elastic body. A pneumatic or hydraulic system could be used to drive the main valve open. Or as in FIG. 4, the valve can be biased open by the cooling system pressure.

Although the above embodiments have been described in light of a nuclear reactor it will be appreciated that the device can be used in any other system where it is important to depressurise a system or discharge the contents of a pressurised system if it reaches a pressure below or above its normal operating pressure. For example, in a pressurised system there is often a requirement to protect against overpressure which would cause vessels or pipework to fail, but the use of this valve would also allow a system to be depressurised in a controlled way if the system pressure falls below the low pressure threshold. This could mean, for example, that a remote leak on a system that cause the pressure to drop would result in the PaD valve opening, releasing the fluid in the system in a predictable way, for example into a safe storage tank. This would prevent fluid from leaking in the remote location where it might cause damage or harm.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A depressurisation valve for a pressurised cooling circuit, the depressurisation valve comprising:
an inlet for coupling to the cooling circuit;
an outlet;
a main valve configured to move between an open position and a closed position, the closed position preventing fluid flow through the main valve from the inlet to the outlet;
a pilot line fluidically coupled to the inlet and closable by a first control valve, the first control valve controlled by pressure at the inlet to open above a low pressure threshold;

a second control valve controlled by pressure at the inlet and configured to open above a high pressure threshold, the high pressure threshold being greater than the low pressure threshold;
a valve dome containing a first piston coupled to the main valve, the valve dome being fluidically coupled to the pilot line, wherein:
in normal operation, the pilot line is operable to transmit fluid pressure from the inlet into the valve dome to apply pressure on a first face of the first piston, the first piston thereby applying a first force to the main valve urging it into the closed position, and
when in operation the pressure in the coolant circuit is lower than the low pressure threshold, the first control valve is configured to close and remove the pressure from the face of the first piston and allowing the main valve to open,
when in operation the pressure in the coolant circuit is higher than the high pressure threshold, the second control valve is configured to open and transmit fluid pressure to apply a second force to the main valve opposing the first force to urge the main valve to the open position.

2. The depressurisation valve of claim 1, further comprising biasing means to bias the main valve open, wherein in normal operation the first force applied by the first piston is sufficient to overcome the bias.

3. The depressurisation valve of claim 2, wherein the biasing means is a spring.

4. The depressurisation valve of claim 2, wherein the first control valve is a changeover valve which comprises a changeover piston and a changeover biasing means operable to bias the first control valve closed, wherein in normal operations pressure in the pilot line is applied to a face of the changeover piston to urge the first control valve open in opposition to the changeover biasing means, and
wherein the second control valve is operable, when the high pressure threshold is exceeded, to open a control valve pilot line to apply pressure to the opposite face of the changeover piston to urge the first control pilot valve closed.

5. The depressurisation valve of claim 4, when the second control valve is operable to open a second pilot line to apply pressure to an opposite face of the first piston urging the main valve open.

6. The depressurisation valve of claim 1, when the second control valve is operable to relieve the pressure in the valve dome by releasing fluid from the valve dome to the outlet through a bleed line, the bleed line having a lower fluid resistance than the pilot line when the second control valve is open.

7. The depressurisation valve of claim 1, when the second control valve is operable to open a second pilot line to apply pressure to an opposite face of the first piston urging the main valve open.

8. The depressurisation valve of claim 1, wherein the second control valve is operable to open a second pilot line to apply pressure to a second piston coupled to the main valve so as to apply a second force to the main valve opposing the first force and urging the main valve into the open position.

9. A nuclear reactor having a cooling circuit comprising the depressurisation valve as claimed in claim 1.

* * * * *